United States Patent
Ludwig et al.

(10) Patent No.: US 9,838,469 B1
(45) Date of Patent: *Dec. 5, 2017

(54) DISTRIBUTED EVENT ENGINE

(71) Applicant: Surround.IO, Seattle, WA (US)

(72) Inventors: John Ludwig, Bellevue, WA (US); Richard Tong, Seattle, WA (US)

(73) Assignee: Surround.IO, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/478,121

(22) Filed: Apr. 3, 2017

Related U.S. Application Data

(63) Continuation of application No. 14/288,379, filed on May 27, 2014, now Pat. No. 9,614,898.

(60) Provisional application No. 61/827,696, filed on May 27, 2013.

(51) Int. Cl.
*G06F 15/16* (2006.01)
*H04L 29/08* (2006.01)
*G06F 3/01* (2006.01)

(52) U.S. Cl.
CPC ............ *H04L 67/10* (2013.01); *G06F 3/017* (2013.01); *H04L 67/18* (2013.01)

(58) Field of Classification Search
CPC ......... H04L 67/10; H04L 67/18; G06F 3/017; H04N 7/181
See application file for complete search history.

(56) References Cited

U.S. PATENT DOCUMENTS

| | | | | |
|---|---|---|---|---|
| 2001/0033330 A1* | 10/2001 | Garoutte | ............ | G06K 9/00771 348/153 |
| 2003/0025614 A1* | 2/2003 | Kahn | ................... | G08G 5/0078 340/961 |
| 2005/0122397 A1* | 6/2005 | Henson | .............. | G06K 9/00771 348/143 |
| 2005/0163345 A1* | 7/2005 | van den Bergen | ........................ | G08B 13/19682 382/103 |
| 2005/0163346 A1* | 7/2005 | van den Bergen | ........................ | G06K 9/00771 382/103 |
| 2006/0093190 A1* | 5/2006 | Cheng | ................ | G06K 9/00771 382/115 |
| 2006/0203090 A1* | 9/2006 | Wang | ..................... | G06K 9/209 348/143 |
| 2007/0117083 A1* | 5/2007 | Winneg | .................... | G09B 7/00 434/350 |
| 2007/0279214 A1* | 12/2007 | Buehler | ........... | G08B 13/19615 340/521 |
| 2007/0282665 A1* | 12/2007 | Buehler | ................. | G06Q 30/02 705/7.29 |
| 2008/0249858 A1* | 10/2008 | Angell | ................... | G06Q 30/02 705/14.43 |
| 2009/0010484 A1* | 1/2009 | Amidi | ................ | H04N 1/32101 382/100 |

(Continued)

*Primary Examiner* — Jonathan Bui
(74) *Attorney, Agent, or Firm* — FSP LLC

(57) ABSTRACT

A system includes event engine logic distributed across a plurality of devices dispersed over an area of coverage, and logic to process events according to layout information homologized by an event web service from scene captures and location data from the plurality of devices, and logic to partition the homologized layout into areas of coverage and to assign each area of coverage to a device or subgroup of devices in the plurality of devices.

6 Claims, 12 Drawing Sheets

(56) References Cited

U.S. PATENT DOCUMENTS

| | | | | |
|---|---|---|---|---|
| 2009/0262195 A1* | 10/2009 | Yoshida | ................ | H04N 5/232 348/159 |
| 2010/0214417 A1* | 8/2010 | Gennari | ........... | G08B 13/19645 348/159 |
| 2011/0064298 A1* | 3/2011 | Schlosser | ................ | G06T 7/596 382/154 |
| 2012/0249802 A1* | 10/2012 | Taylor | ..................... | G06T 7/292 348/169 |
| 2013/0130683 A1* | 5/2013 | Krukar | ................ | H04W 4/022 455/435.1 |
| 2013/0148855 A1* | 6/2013 | Yasugi | ................ | G01S 13/867 382/103 |
| 2014/0247368 A1* | 9/2014 | Chinn | ................ | H04N 5/23222 348/207.1 |
| 2015/0100991 A1* | 4/2015 | Risberg | ................ | H04L 67/104 725/80 |

* cited by examiner

DISTRIBUTED EVENT ENGINE

CROSS-REFERENCE TO RELATED APPLICATIONS

This application claims priority and benefit as a continuation of U.S. application Ser. No. 14/288,379, filed on May 27, 2014, which claims priority and benefit under 35 USC119 to U.S. application No. 61/827,696, filed on May 27, 2013.

BACKGROUND OF THE INVENTION

There are challenges to operating an application, such as a game, over a set of distributed devices. It is challenging to scale such an application to millions of nodes. Engines for MMOGs scale up to hundreds of thousands of players, operated over many servers. However, they do not scale down to lightweight devices (systems on chips), and they don't scale out to operation on devices owned by independent parties. Rather, they are operated only in centralized and usually commonly-owned datacenters.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION OF THE INVENTION

Figure 1:
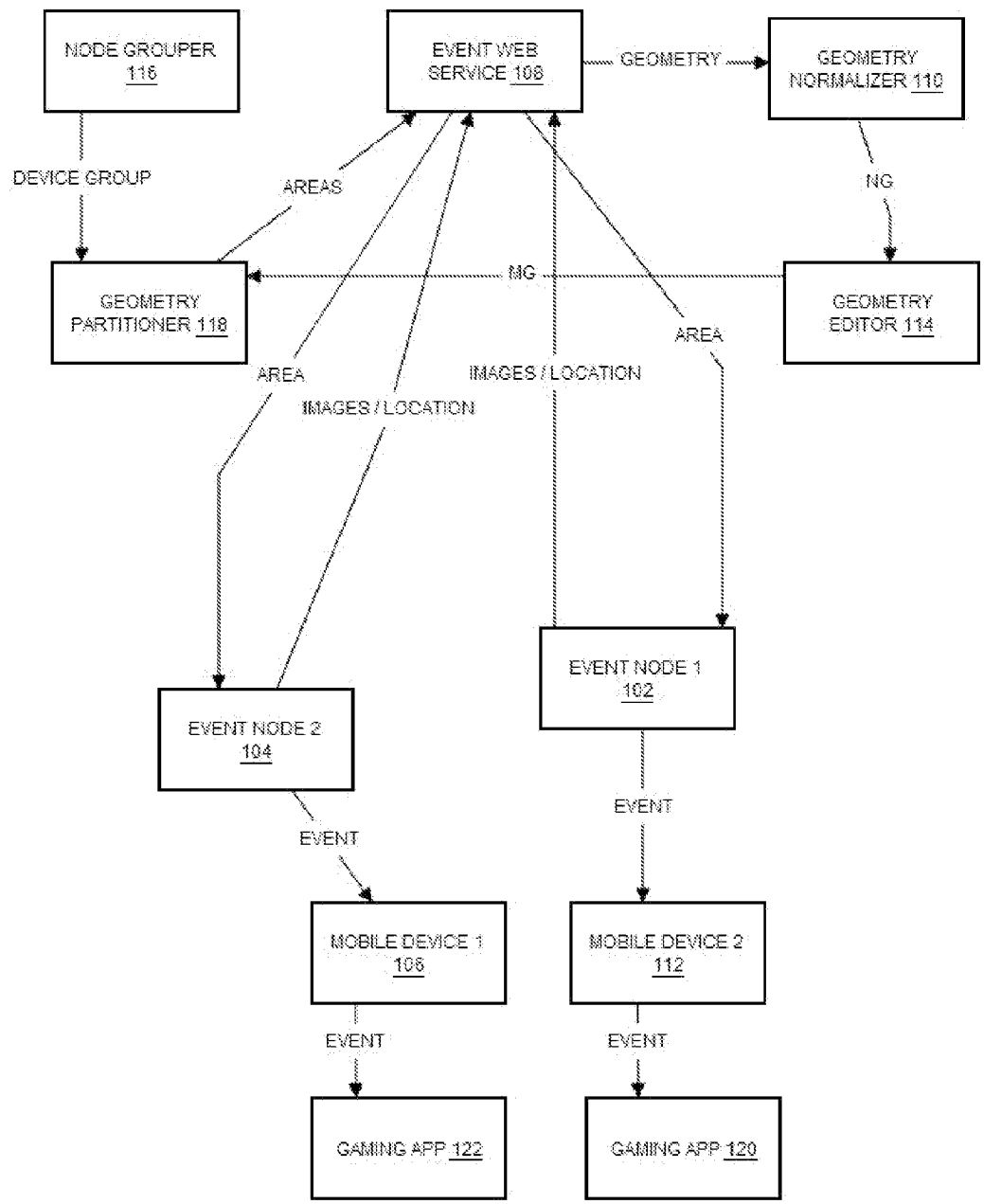
FIG. 1 is a system diagram of an embodiment of a distributed event engine.

'Application (logic)' in this context refers to logic that causes a computer to perform tasks beyond the basic operation of the computer itself. The term "application" may be abbreviated in some contexts to simply "app". An application may be logic built upon or integrated with operating system logic. Examples of application logic include enterprise software, accounting software, office suites, graphics software, games, web browsers, and media players. Applications may be bundled with the computer and its system software or published separately. Application logic applies the capabilities of a particular computing platform or system software to a particular purpose. Some applications are available in versions for several different platforms; others have narrower requirements and are thus called, for example, a Geography application for Windows or an Android application for education or Linux gaming.

'Operating system (logic)' in this context refers to logic that manages device hardware resources and provides common services for application logic. The operating system is a vital component of many devices, such as computers and mobile phones. Application logic usually requires an operating system in order to function. Operating systems typically manage utilization of device resources, such as I/O devices, displays, processor utilization, memory, mass storage, and printing. The operating system acts as an intermediary between applications and the hardware resources, although applications are often (though not always, in the case of virtual machines) executed directly by the device hardware (e.g., one or more CPUs) and will frequently make system calls to the operating system, or be interrupted by it. Operating systems can be found on almost any device that contains a programmable processor or controller, from cellular phones and video game consoles to supercomputers and web servers.

'Distributed (logic)' in this context refers to logic that cooperatively executes on multiple different devices, separated in space and each capable of operating independently of the others. Web services may be designed as distributed logic, with many different independent devices in disparate locations cooperating to provide a common set of features.

'Web service (logic)' in this context refers to logic which can be invoked to provide functionality to network devices at a network address over the Internet or a private network. A web service provides interoperable machine-to-machine interaction to make available a set of functionality over a network.

'MMOG (logic)' in this context refers to "Massively Multiplayer Online Game".

'SOC (logic)' in this context refers to "System-On-A-Chip", also sometimes called PSOC (Programmable System on a Chip), is logic that integrates all components of a computer or other electronic system into a single integrated circuit. The package may comprise digital, analog, mixed-signal, and often radio-frequency functions—all on a single integrated circuit substrate. A common use for SOCs is in embedded systems.

'Server (logic)' in this context refers to logic designed to respond to requests for functionality from client logic that interacts with the server logic via a request/response model, often over a network. Thus, the server performs some operation utilizing the underlying resources of the device or devices hosting the server, on behalf of clients (request submitters). The client logic either executes on the same device or devices as the server logic, or interacts with the server logic through a machine data network.

'Data center (logic)' in this context refers to a facility used to house computer systems and associated components, such as telecommunications and storage systems. It generally includes redundant or backup power supplies, redundant data communications connections, environmental controls (e.g., air conditioning, fire suppression) and security devices, as well as hundreds or thousands of server systems. Large data centers are industrial scale operations.

'GPS' in this context refers to (Global Positioning System) a space-based satellite navigation system that provides location and time information in most weather conditions, anywhere on or near the Earth where there is an unobstructed line of sight to four or more GPS satellites. The system provides critical capabilities to military, civil and commercial users around the world. It is maintained by the United States government and is freely accessible to anyone with a GPS receiver.

'Sensor' in this context refers to a device or composition of matter that responds to a physical stimulus (as heat, light, sound, pressure, magnetism, or a particular motion) and transmits a resulting impulse (as for measurement or operating a control).

'Cellular (Device)' in this context refers to a device that can place and receive voice communication calls, and typically also communicate non-voice data, over a radio link while moving around a wide geographic area. Cellular devices connect to a cellular network provided by a cellular system operator (e.g., a phone company), allowing access thereby to the public (wired communication) telephone network and usually to the global Internet as well.

'Camera' in this context refers to a device that records images and/or video, either as analog or as digital information signals.

'Image' in this context refers to information captured and stored by a device representing a visual perception, usually a two-dimensional picture. Images may be captured, stored, and communicated by devices in either analog or digital formats.

'Video' in this context refers to information captured and stored by a device representing a sequence of moving pictures. Video may be captured, stored, and communicated by devices in either analog or digital formats.

'Web site' in this context refers to a set of one or more web pages served from a single web domain. A web site is presented for access by external devices by at least one web server, and accessible via a network such as the Internet or a private local area network through an Internet address known as a Uniform Resource Locator.

'URL' in this context refers to (Uniform Resource Locator) a character string that comprises a reference to a network resource, typically one that is accessible to a web browser via an interaction with a web server.

'Web page' in this context refers to a file configured for access and display via a web browser over the Internet, or Internet-compatible networks.

'Web browser' in this context refers to logic for retrieving, presenting and traversing information resources on the World Wide Web. An information resource is identified by a Uniform Resource Identifier (URI) and may be a web page, image, video or other piece of content.[1] Hyperlinks present in resources enable users easily to navigate their browsers to related resources. A web browser can also be defined as an application software or program designed to enable users to access, retrieve and view documents and other resources on the Internet.

'Web server' in this context refers to a device or device system that delivers web pages in response to requests for the web pages from web browsers.

'Web domain' in this context refers to an Internet Protocol (IP) resource, such as a personal computer used to access the Internet, a web server computer hosting a web site, the web site itself, or any other service communicated via the Internet.

'IP' in this context refers to (Internet Protocol) a primary protocol in the Internet protocol suite designed to enable delivery of data packets from a source device to a destination device based on an address (i.e., an IP address). IP defines datagram structures that encapsulate the data to be delivered. It also defines addressing mechanisms to identify the datagram source and destination devices.

'Microphone' in this context refers to an acoustic-to-electric transducer or sensor that converts sound into an electrical signal. Many microphones use electromagnetic induction (dynamic microphone), capacitance change (condenser microphone), piezoelectric generation, or light modulation to produce an electrical voltage signal from mechanical vibration.

'GPS' in this context refers to (Global Positioning System) a space-based satellite navigation system that provides location and time information in most weather conditions, anywhere on or near the Earth where there is an unobstructed line of sight to four or more GPS satellites. The system provides critical capabilities to military, civil and commercial users around the world. It is maintained by the United States government and is freely accessible to anyone with a GPS receiver.

'Sensor' in this context refers to a device or composition of matter that responds to a physical stimulus (as heat, light, sound, pressure, magnetism, or a particular motion) and transmits a resulting impulse (as for measurement or operating a control).

'Engine' refers to logic that provides high-performance detection and processing of events and may also (in the case of a 'game engine' provide services common to interactive computer-implemented games, such as collision detection, physics modeling, rendering of pixels or sound, and so on.

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. References to "or" among elements indicates one or more of the elements, unless the context indicates otherwise.

"Logic" refers to machine memory circuits, machine readable media, and/or circuitry which by way of its material and/or material-energy configuration comprises control and/or procedural signals, and/or settings and values, that may be applied to influence the operation of a device. Magnetic media, electronic circuits, electrical and optical memory (both volatile and nonvolatile), and firmware are examples of logic.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic is a design decision that will vary according to implementation.

An event engine is distributed across multiple devices, the distribution based on the physical location of devices. Events are distributed to devices, and each device participates in either generating events or rendering event results. The event engine also can take advantage of sensors on devices to generate events corresponding to physical changes at or around the devices. One embodiment of the system may include event engine logic distributed across a plurality of devices dispersed over an area of coverage, and logic to process events according to layout information homologized by an event web service from scene captures and location data from the plurality of devices, and logic to partition the homologized layout into areas of coverage and to assign each area of coverage to a device or subgroup of devices in the plurality of devices. Each device may generate events for motion of objects or people in its assigned area. The events may correspond to gestures by people. The homologized layout is partitioned by the event web service and each device is assigned an area of the layout to monitor for events. Each device may generate events for sounds in its assigned area. The generated events may be communicated to the event web service. The event engine logic may map events to game actions, performs collision detection, and determines associated sounds or optical effects.

The system generates events for physical world actions and is scalable both locally and globally through a distributed design. One use of the event engine is for games, for example by incorporating the event engine into a 'game engine'. Each device generates game events, passes events to other participating devices, and accepts inbound events and renders them locally. The event engine may determine which devices are physically proximate, and involves only necessary devices in the operation of the local event handling.

The event engine may incorporate objects in the physical world into its operation. Devices that make up the event engine may first characterize the space (geometry) in which they are installed. The event engine logic is installed on each of these devices, which can be (for example) personal computers, tablets, dedicated game server machines, or SOC-based machines such as cellular phones, or iPods®/iPads®.

In one embodiment, each device (event node) is equipped with at least a camera, and possibly with a stereo camera, or multiple stereo cameras. Each device is also equipped with a microphone or stereo microphones, proximity and distance sensors, attitude and movement sensors, and a GPS receiver. Each device may determine its own location via some mechanism, for example the onboard GPS receiver, OS location services, or by direct user (human operator) entry.

In one embodiment, each device captures images, distance, and proximity information for the area it can observe. This information is used to calculate a geometry description (layout) of the area, including the relative location of (and possibly distanced between) walls, floors, and objects. Each device may post its own location and the area layout to an event web service operating remotely. The event service accepts geometry information from devices, homologizes the information, and sends back a normalized world geometry to the devices. The geometry information may also be editable by a user at the event web service website, if a user wants to improve the world (homologized) layout description.

The following description applies to one embodiment of the system. A user (or other grouping logic) may create a grouping of devices for use in an application, such as a game. The user may perform this at the event service website, or may perform this grouping using some other mechanism. The homologized layout is partitioned and each device is responsible for one or more partitions and/or set of objects. The event server partitions the event space and informs each device which portion of the geometry it is responsible for monitoring. Each device converts its global geometry responsibility into local parameters, including what portion of each camera scene should it monitor, how deeply should it monitor, etc. Each device monitors its assigned area and identifies events. Events could include objects moving. The device sends events for motion changes. Each event includes the motion velocity and time of motion. Substantial changes in velocity (speed or direction) results in new events. For people moving, the device sends events for motion changes. Each event includes the motion velocity and time of motion. Substantial changes in velocity (speed or direction) results in new events. Additionally the event server may detect the identity of people using face recognition or other facilities.

A particular event node may detect the entry or departure of new objects into its area of monitoring responsibility and sends events. The device detects the entry or departure of new people into its area of monitoring responsibility and sends events. Additionally the event server may detect the identity of people using face recognition or other facilities.

An application (app) operating with the event service can define gestures which the event service will watch for. Gestures could include movement, or audio, or any other sensed input, or a combination of these inputs. Applications can use these gestures as appropriate. For instance a game application could interpret a certain arm gesture to mean that a projectile was launched, or a spell was cast.

Each device sends event info to the event service and to other devices. In one instantiation, each device sends events to just event service, and the event service is responsible for forwarding to other devices. In another instantiation, each device gets a list of participating devices from the event service, and sends events directly to them. In another instantiation, each device gets a list of participating devices from the event service, and sends events to them using a message queuing service. Each device accepts inbound event info and routes to the local application using events.

Events can be from local sensors, or events can be from the network, forwarded from other devices or from the event service. The event engine may examine the incoming event, calculate its implications, and generate new events based on the results.

For instance, if one device observed a gesture implying a projectile launch, it may have sent an event to a neighboring device indicating an incoming projectile. The neighboring device will accept this input, and may calculate that the projectile passes through its area of monitoring responsibility to that of a 3rd device, and will then send a new event onto this 3rd device. Or the device may calculate that the projectile hits a certain object, and may raise that event back to the event service, which may keep track of collisions.

The event engine may examine the incoming event and render it to locally managed output devices. For instance, an event may result in audio or videos being played locally. For instance, a projectile may impact an object, and the device may render audio on local speakers and flashing lights on local video displays.

Alternatively, the event engine may deliver events to local apps, and it may be the responsibility of local apps to calculate impacts and to raise new events, render sounds, etc. The system can scale locally and globally. Finer resolution for a certain area can be provided by installing more devices locally, and making each responsible for a smaller area of monitoring. Games can also span a large area by spreading many devices out. Each device is responsible for only its own area and objects in that area, supporting networks of arbitrarily large numbers of devices.

The techniques and procedures described herein may be implemented via logic distributed in one or more computing devices. The particular distribution and choice of logic may vary according to implementation.

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

DRAWINGS

Figure 2:
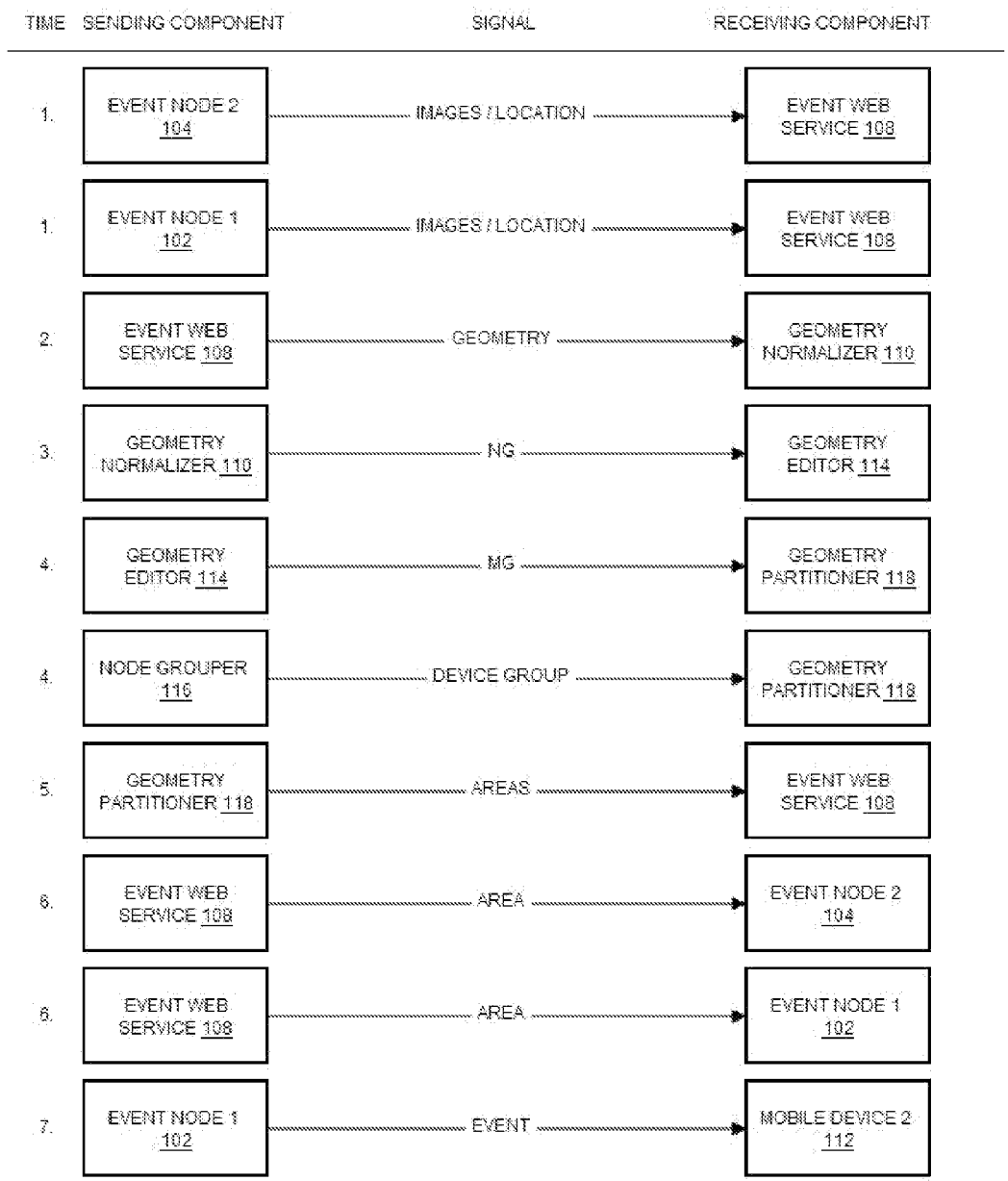
FIG. 2 is an action flow diagram of an embodiment of a distributed event engine process.
Figure 3:
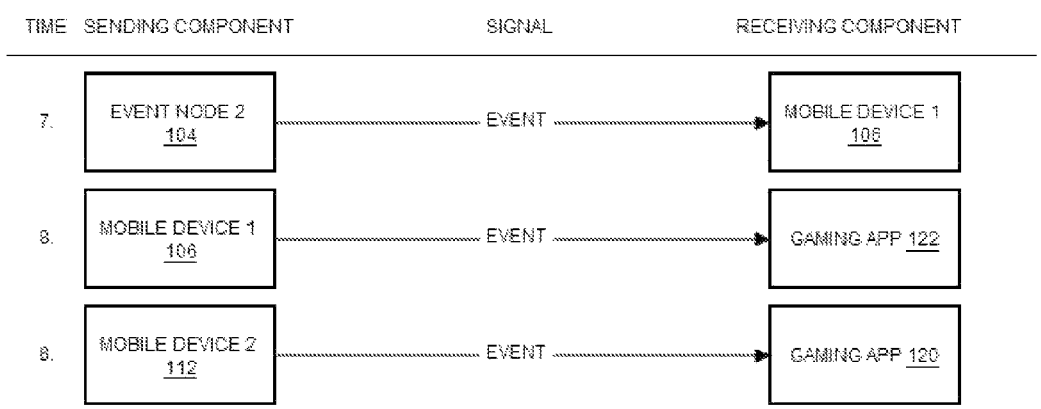
FIG. 3 is an action flow diagram of an embodiment of a distributed event engine process.
Figure 4:
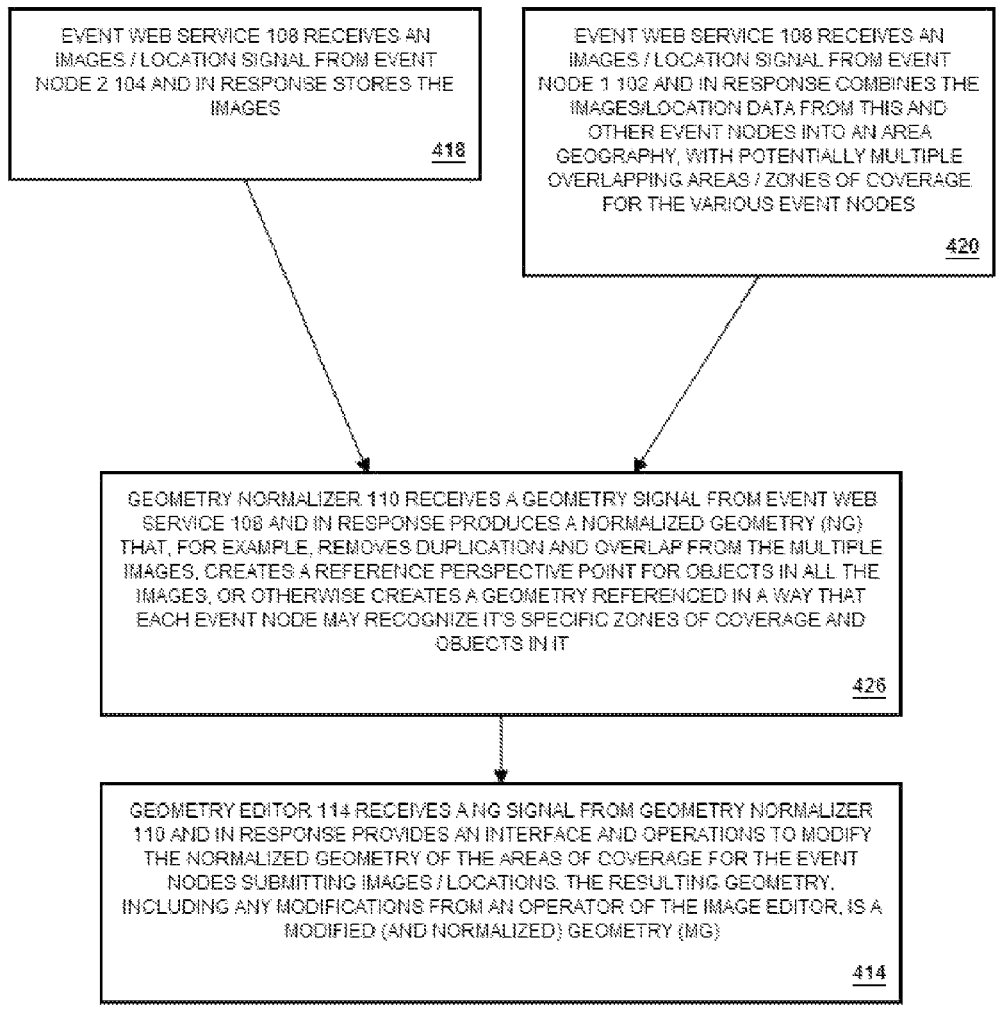
FIG. 4 is a flow chart of an embodiment of a distributed event engine process.
Figure 5:
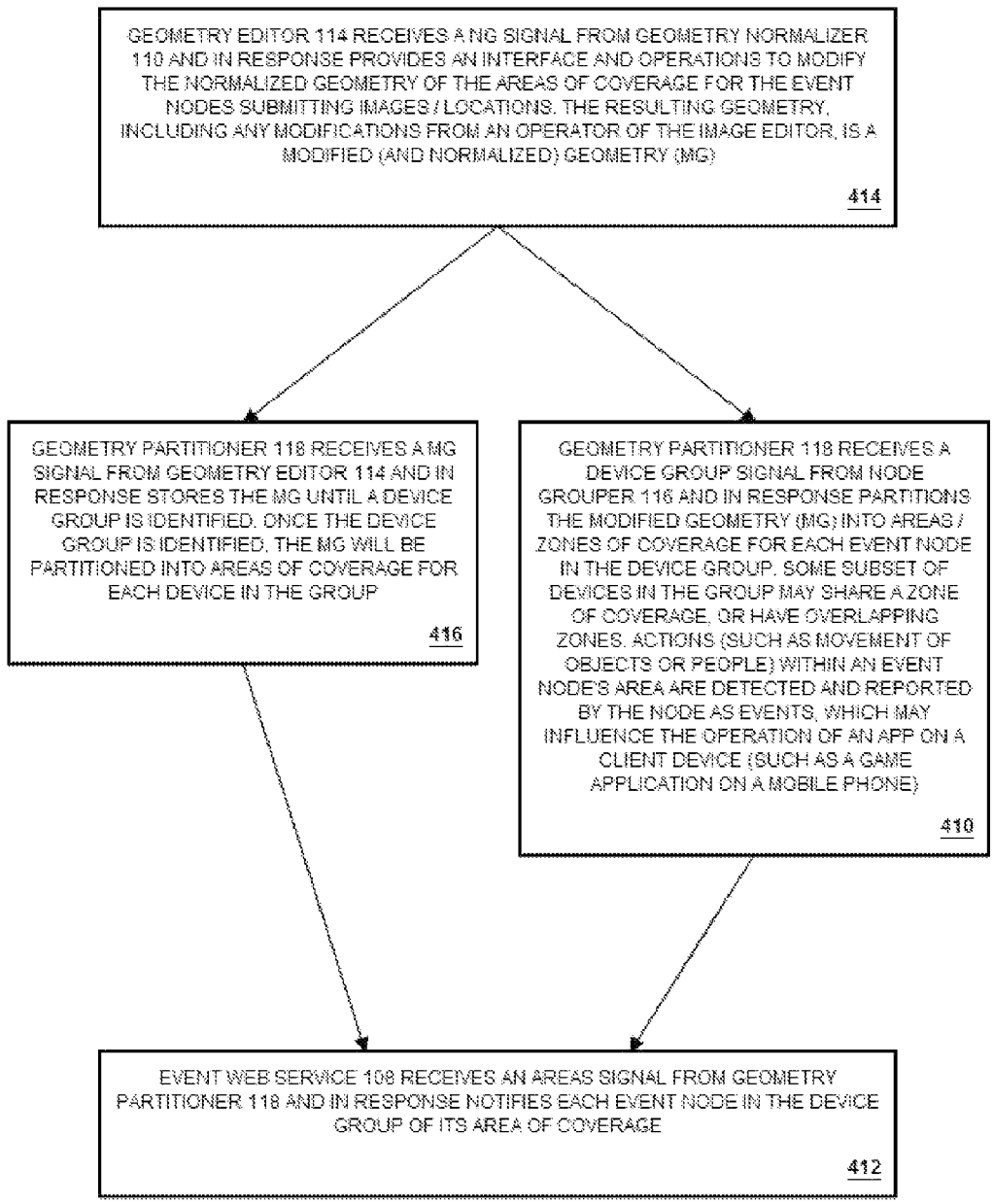
FIG. 5 is a flow chart of an embodiment of a distributed event engine process.
Figure 6:
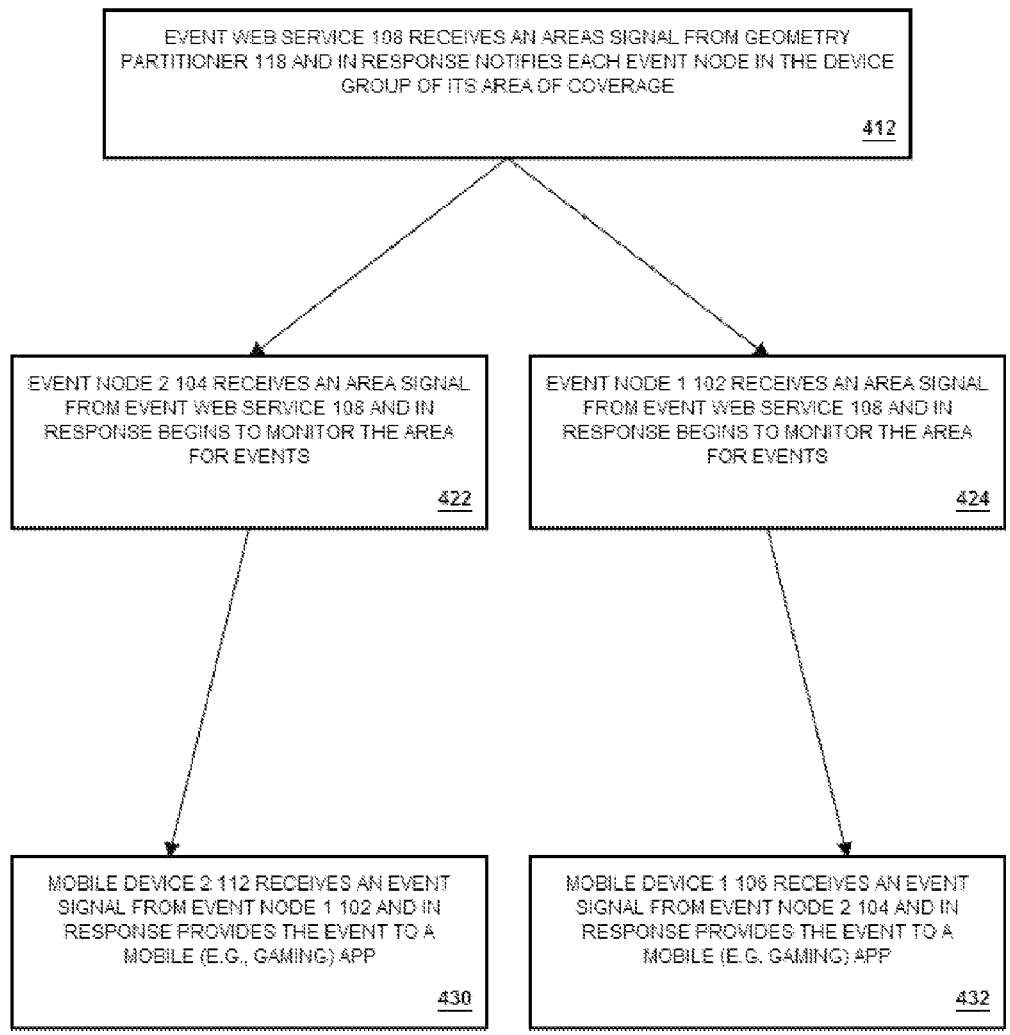
FIG. 6 is a flow chart of an embodiment of a distributed event engine process.
Figure 7:
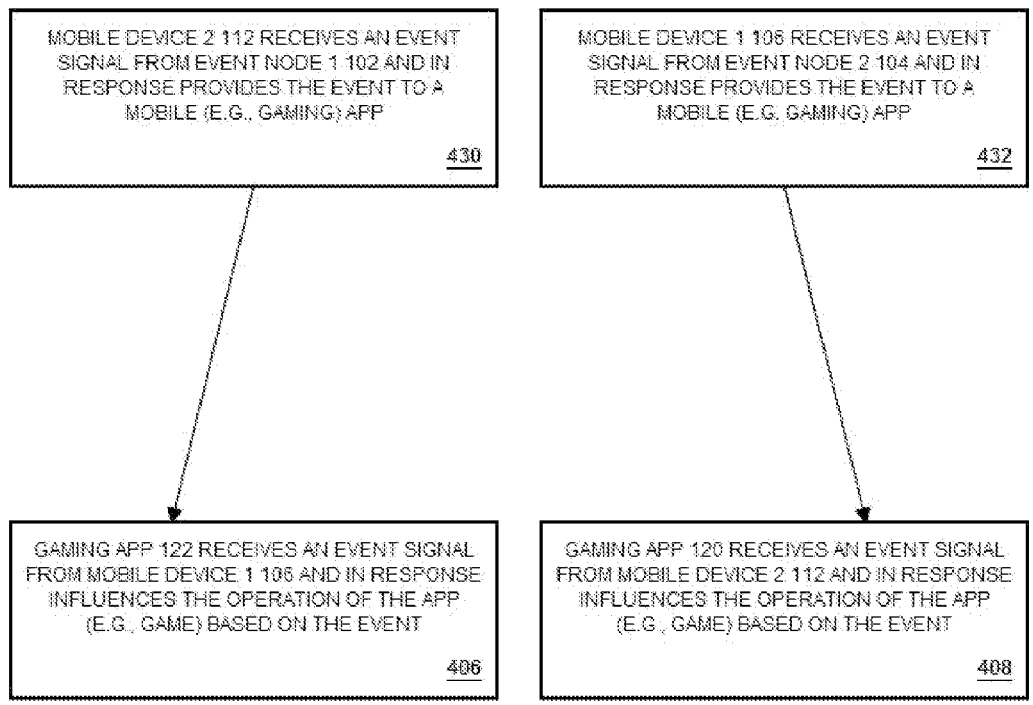
FIG. 7 is a flow chart of an embodiment of a distributed event engine process.

FIG. 1 is a system diagram of an embodiment of a distributed event engine. FIG. 2-3 is an action flow diagram of an embodiment of a distributed event engine process. FIG. 4-7 is a flow chart of an embodiment of a distributed event engine process. Collectively, these drawings illustrate a system and process for forming an event monitoring system for distributed applications (such as mobile gaming) where multiple devices (event nodes) form a network to monitor a distributed geography for actions constituting potential events.

The examplary system comprises event node 1 102, event node 2 104, mobile device 1 106, event web service 108, geometry normalizer 110, mobile device 2 112, geometry editor 114, node grouper 116, geometry partitioner 118, gaming app 120, and gaming app 122. The event web service 108 receives an images/location signal from event node 1 102, event node 2 104, and any other event node devices in the area, and in response stores the images/location data (418), and combines the images/location data into an area geography, with potentially multiple overlapping areas/zones of coverage for the various event nodes (420). The geometry normalizer 110 receives a geometry signal from event web service 108 and in response produces a normalized geometry (NG) that, for example, creates a reference perspective/distances for objects in all the images, or otherwise creates a geometry referenced in a way that each event node may recognize it's specific zones of coverage and objects in it (426). The geometry editor 114 receives a NG signal from geometry normalizer 110 and in response provides an interface and operations to modify the normalized geometry of the areas of coverage for the event nodes submitting images/locations. The resulting geometry, including any modifications from an operator of the image editor, is a modified (and normalized) geometry (MG) (414).

The geometry partitioner 118 receives a MG signal from geometry editor 114 and in response stores the MG until a device group is identified. Once the device group is identified, the MG will be partitioned into areas of coverage for each device in the group (416). The geometry partitioner 118 receives the device group signal from node grouper 116 (this could be a person, or an intelligent organizer module) and in response partitions the modified geometry (MG) into areas/zones of coverage for each event node in the device group. Some subset of devices in the group may share a zone of coverage, or have overlapping zones. Actions (such as movement of objects or people) within an event node's area are detected and reported by the node as events, which may influence the operation of an app on a client device (such as a game application on a mobile phone) (410). The event web service 108 receives the areas from geometry partitioner 118 and in response notifies each event node in the device group of its area of coverage (412).

The event node 2 104 receives an area signal from event web service 108 and in response begins to monitor the area for events (422). The event node 1 102 also receives an area signal from event web service 108 and in response begins to monitor the area for events (424). The system goes operational. Actions are detected, such as movement of objects or people in the monitored areas of coverage. The mobile device 2 112 receives an event signal from event node 1 102 and in response provides the event to a mobile (e.g., gaming) app (430). The mobile device 1 106 receives an event signal from event node 2 104 and in response provides the event to a mobile (e.g. gaming) app (432). The gaming app 122 receives an event signal from mobile device 1 106 and in response influences the operation of the app (e.g., game) based on the event (406). The gaming app 120 also receives an event signal from mobile device 2 112 and in response influences operation of the app (408).

Figure 8:
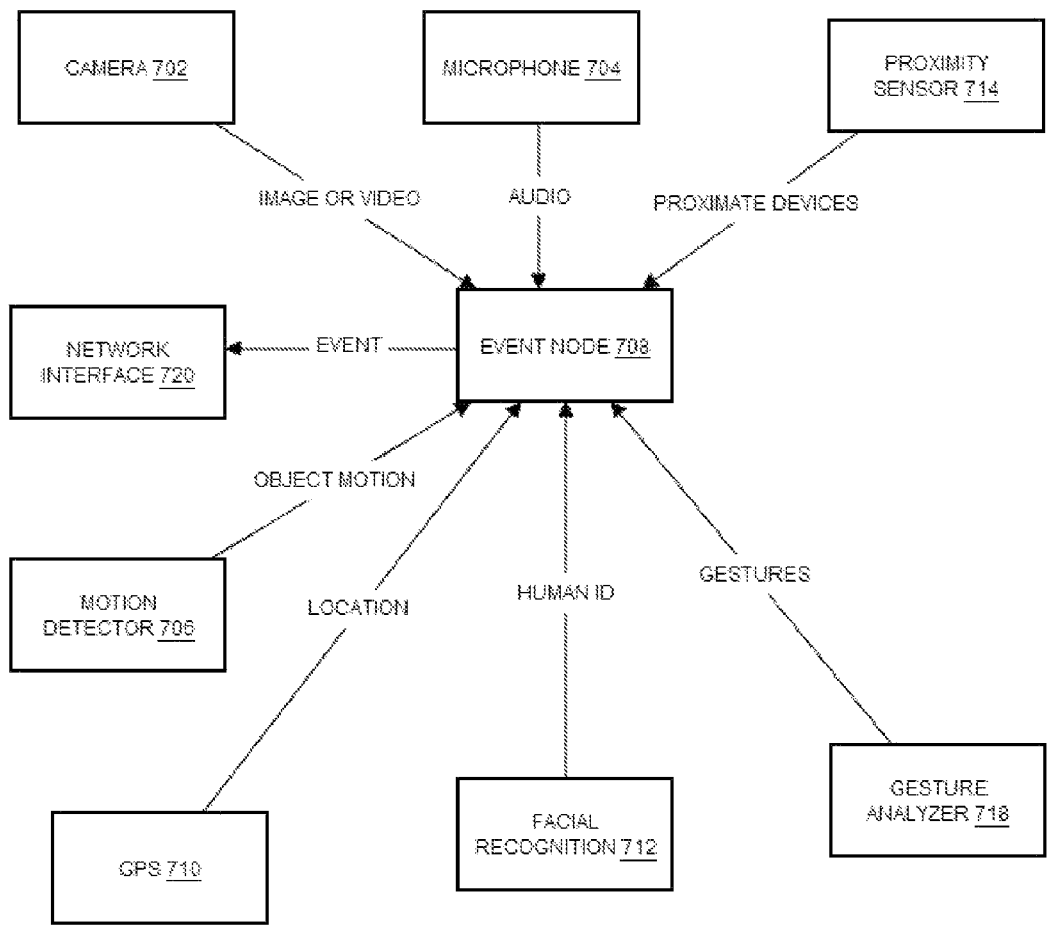
FIG. 8 is a system diagram of an embodiment of an event node.
Figure 9:
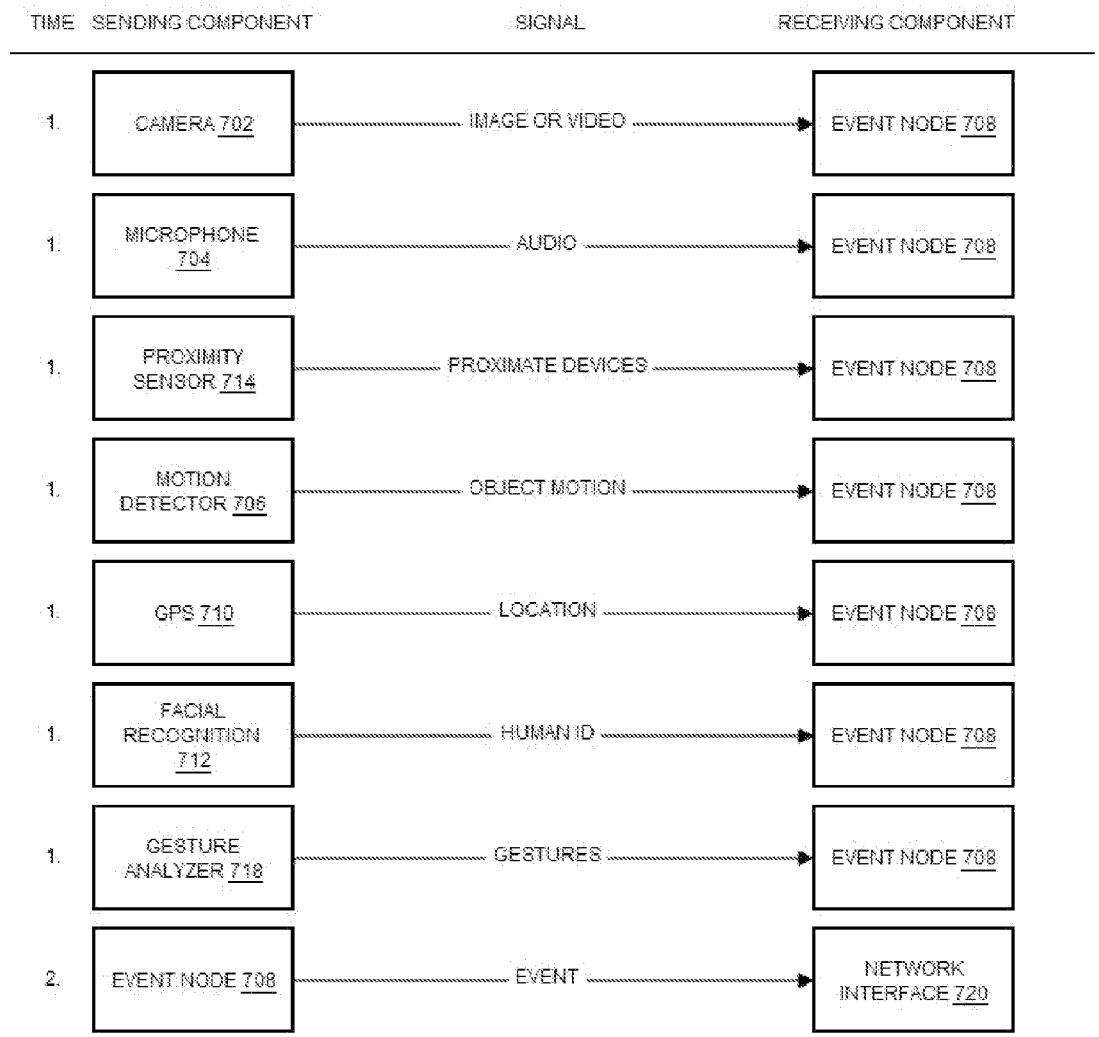
FIG. 9 is an action flow diagram of an embodiment of an event node process.
Figure 10:
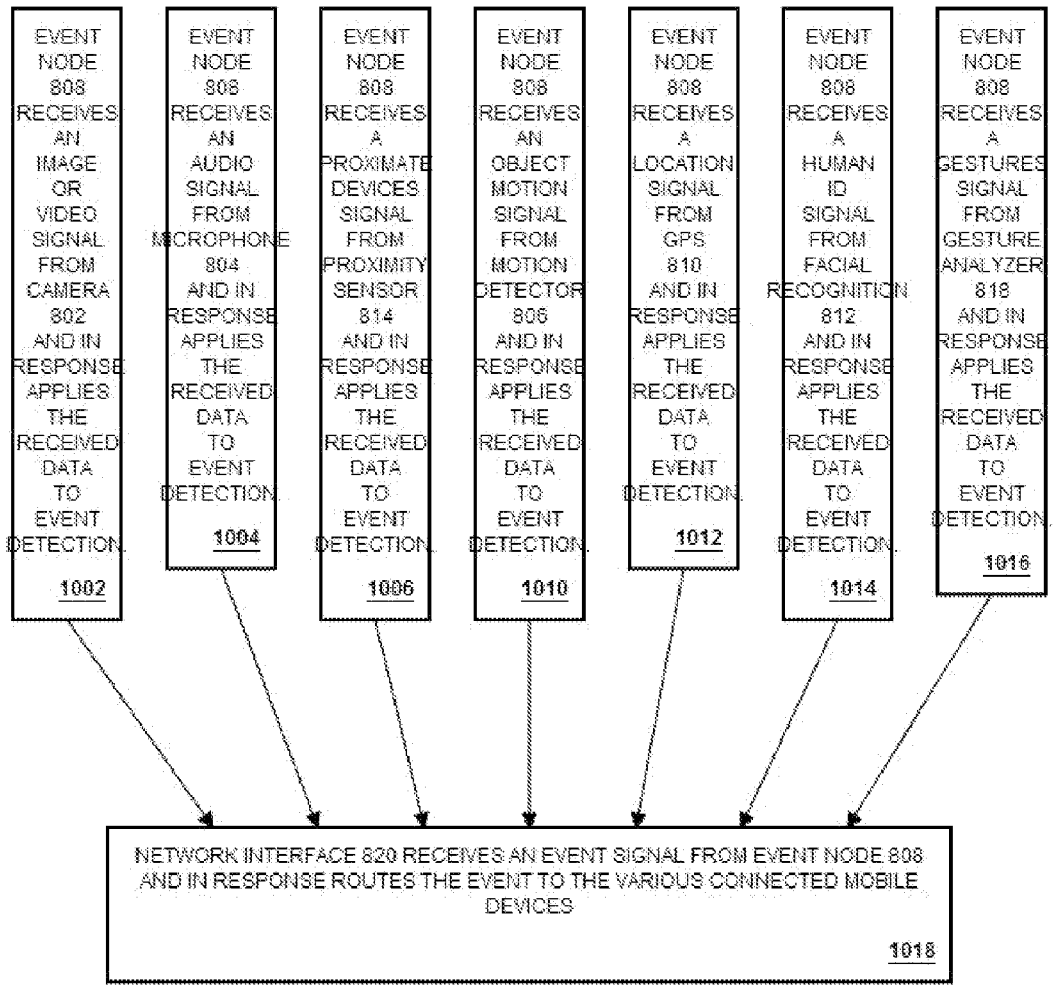
FIG. 10 is a flow chart of an embodiment of an event node process.

FIG. 8 is a system diagram of an embodiment of an event node. FIG. 9 is an action flow diagram of an embodiment of an event node process. FIG. 10 is a flow chart of an embodiment of an event node process. Collectively, these drawings illustrate a device and process for utilizing data from many sources to determine an event in a monitored zone of coverage for an event node device. The system (e.g., event node device) comprises camera 802, microphone 804, motion detector 806, event node 808, GPS 810, facial recognition 812, proximity sensor 814, gesture analyzer 818, and network interface 820. The event node 808 receives an image or video signal from camera 802, an audio signal from microphone 804, a proximate devices signal from proximity sensor 814, an object motion signal from motion detector 806, a location signal from GPS 810, a human id signal from facial recognition 812, a gestures signal from gesture analyzer 818, and in response applies the received data to event detection (1002-1016) and/or creation of a geometry of the area to monitor collectively with other event nodes. The network interface 820 receives an event signal from event node 808 and in response routes the event to the various connected mobile devices (1018).

Figure 11:
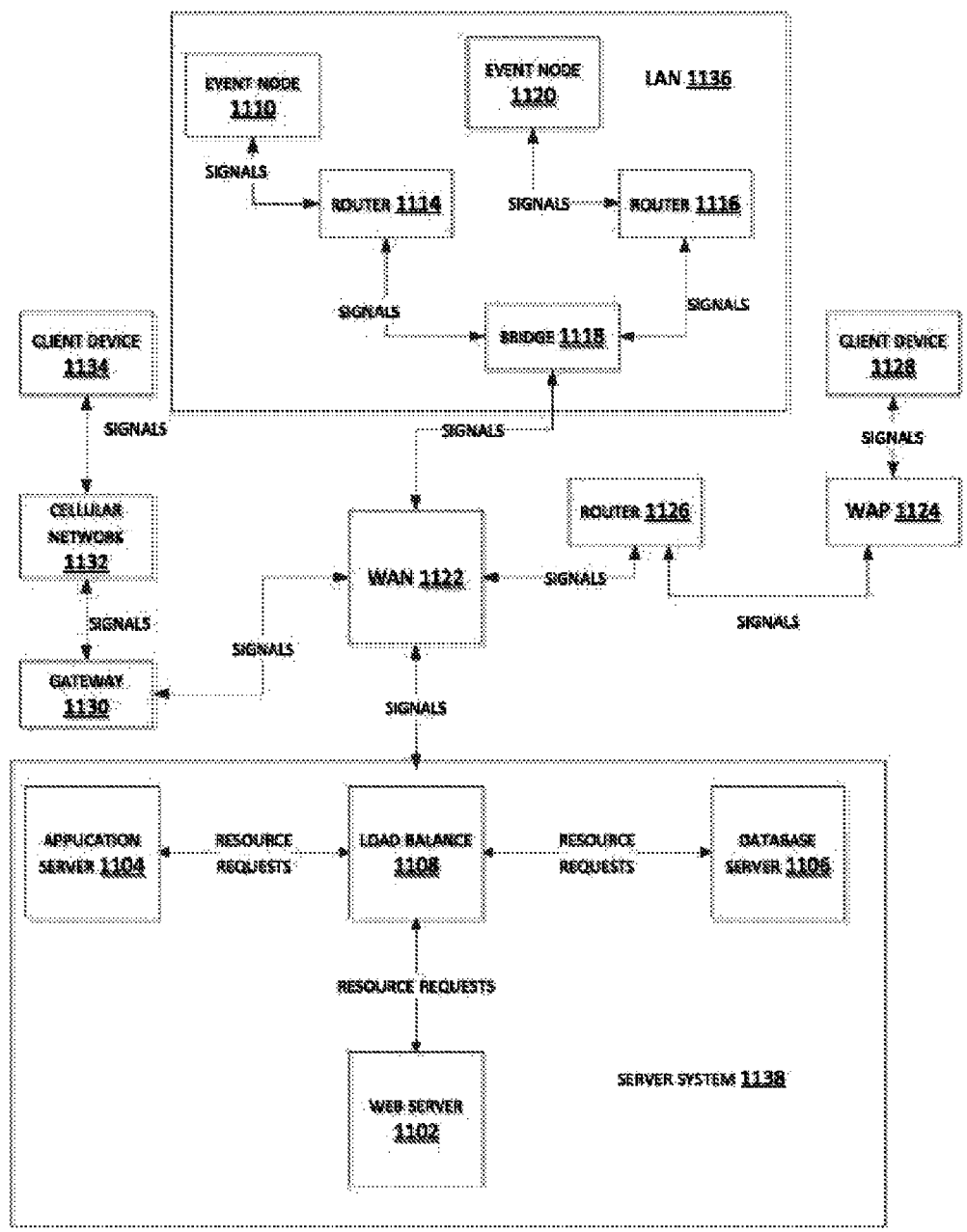
FIG. 11 is an embodiment of a distributed event engine.

A distributed event engine as described herein may be implemented in one embodiment by the machine system illustrated in FIG. 11. Several network access technologies between client devices and server resources are illustrated, including cellular network 1132, LAN 1136, and WAP 1124. Signals representing server resource requests are output from client devices 1110, 1120, 1128, and 1134 to the various access networks, from which they are propagated to a WAN 1122 (e.g., the Internet) and from there to a server system. These signals are typically encoded into standard protocols such as Internet Protocol (IP), TCP/IP, and HTTP. When the clients are part of a LAN 1136, the signals may be propagated via one or more router 1114 1116 and a bridge 1118. A router 1126 may propagate signals from the WAP 1124 to the WAN 1122. A gateway 1130 may propagate signals from the cellular network 1132 to the WAN 1122. The server system 1138 in this example comprises a number of separate server devices, typically each implemented in the separated machine, although this is not necessarily the case. The signals from the client devices are provided via a load balancing server 1108 to one or more application server 1104 and one or more database server 1116. Load balancing server 1108 maintains an even load distribution to the other server, including web server 1102, application server 1104, and database server 1106. Each server in the drawing may represent in effect multiple servers of that type. The load balancing server 1108, application server 1104, and database server 1106 may collectively implement an event system as described herein. The signals applied to the database server 1106 may cause the database server 1106 to access and certain memory addresses, which correlates to certain rows and columns in a memory device. These signals from the database server 1106 may also be applied to application server 1104 via the load balancing server 1108. Signals applied by the application server 1104, via the load balancing server 1108, to the web server 1102, may result in web page modifications which are in turn communicated to a client device, as described herein in regards to user interface and interaction signals to and from a client device. The event detection and processing system described herein may thus be implemented as devices coordinated on a LAN, or over a wide geographical area utilizing a WAN or cellular network, or over a limited area (room or house or store/bar) utilizing a WAP. Features of client logic to process events may thus be implemented, for example, as an application (app) on a mobile phone interfacing to a network in one of the manners illustrated in this figure. The event system described herein may be implemented as a pure or hybrid peer to peer system in a local or widely distributed area.

Figure 12:
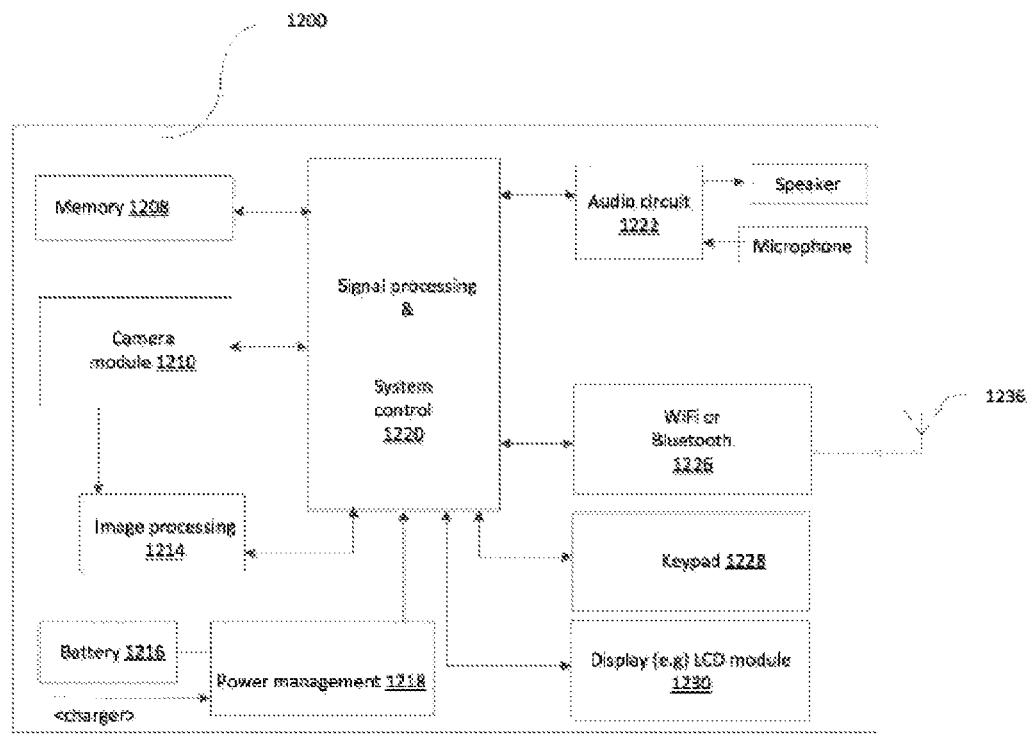
FIG. 12 is an embodiment of an event node.

FIG. 12 illustrates a device 1200 that may implement an embodiment of an event node. Logic 1220 provides device system control over other components and coordination between those components as well as signal processing for the device. Signal processing and system control logic 1220 extracts baseband signals from the radio frequency signals received by the device, and processes baseband signals up to radio frequency signals for communications transmitted from the device. Logic 1220 may comprise a central processing unit, digital signal processor, and/or one or more controllers or combinations above these components. The device may further comprise memory 1208 which may be utilized by the central processors, digital signal processors in controllers of the systems logic 1220.

A camera module 1210 may interface to a camera device to capture images and video from the environment. These images and video may be provided to an image processing module 1214 for enhancement, compression, and other processing, and from there to the central control logic 420 for further processing and storage to memory 1208.

Images, video and other display information, for example, user interface optical patterns, may be output to a display module 1230 or to a network interface (as events or data to be processed into events). The display module 1230 may operate as a user input device, being touch sensitive where contact or close contact by a use's finger or other device handled by the user may be detected by transducers. An area of contact or proximity to the display module 1230 may also be detected by transducers and this information may be supplied to the control logic 1220 to affect the internal operation of the mobile device 1200 and to influence control and operation of its various components.

Audio signals may be provided to an audio circuit 1222 from which signals output to one and more speakers to create pressure waves in the external environment representing the audio. These audio signals may also be provided to a network interface (as events or data to be processed into events).

The device 1200 may operate on power received from a battery 1216, or from utility power sources. The battery capability and energy supply may be managed by a power management module 1218.

Another user interface device operated by control logic 1220 is a keypad 1228 which responds to pressure or contact events by a user of the device. As noted the keypad may in some cases be implemented by transducers of the display module 1230.

The device 1200 may generate short range wireless signals to influence other devices in its proximity, and may receive wireless signals from those proximate devices using antenna 1236. Short range radio signals may influence the device, or be generated by the device for output to the environment, through a BlueTooth or WiFi module 1226. Other forms of electromagnetic radiation may be used to interact with proximate devices, such as infrared (not illustrated).

The device 1200 may convert audio phenomenon from the environment into internal electro or optical signals by using microphone and the audio circuit 1222.

What is claimed is:

1. A system comprising:
    at least one computer server device comprising one or more processors; and
    an event web service that when executed at least in part by the one or more processors of the at least one computer server device creates a homologized layout from scene captures and location data from a plurality of devices dispersed over an area of coverage, partitions the homologized layout into smaller areas of coverage, and assigns each smaller area of coverage to a device or subgroup of devices in the plurality of devices, wherein each device generates events from monitoring its assigned area.

2. The system of claim 1, wherein each device generates events for motion of objects or people in its assigned area.

3. The system of claim 2, the events corresponding to gestures by people.

4. The system of claim 1, wherein each device generates events for sounds in its assigned area.

5. The system of claim 4, wherein the generated events are communicated to the event web service.

6. The system of claim 1, wherein the event engine logic maps events to user actions of gesturing with the devices, performs collision detection, and determines associated sounds or optical effects.

* * * * *